UNITED STATES PATENT OFFICE.

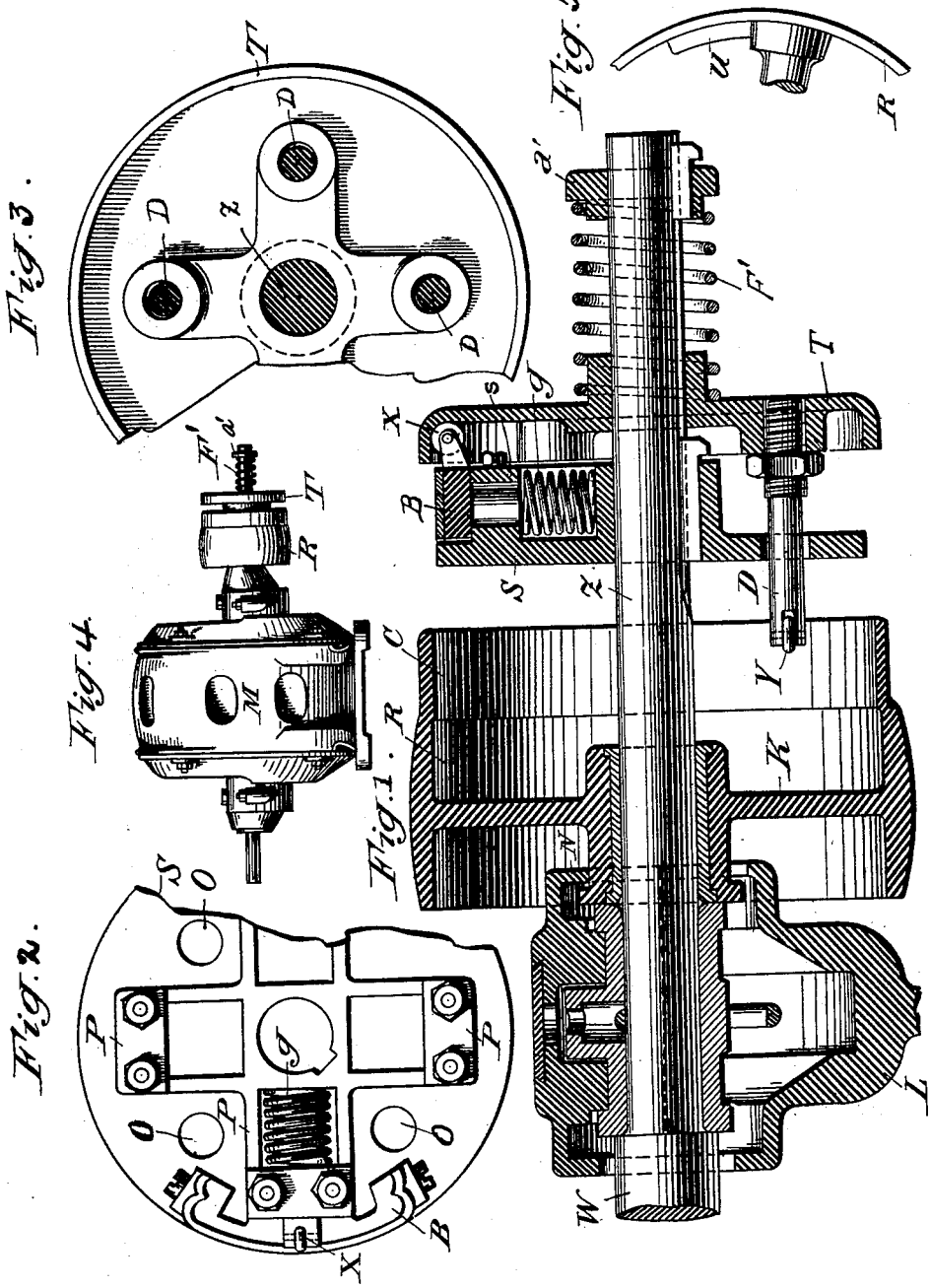

ALFRED SCHWARTZ, OF MUNICH, GERMANY, ASSIGNOR TO HELIOS ELEC-TRICITAETS-AKTIENGESELLSCHAFT, OF COLOGNE-EHRENFELD, GERMANY.

CLUTCH FOR INDUCTION-MOTORS.

SPECIFICATION forming part of Letters Patent No. 706,117, dated August 5, 1902.

Original application filed March 18, 1901, Serial No. 51,734. Divided and this application filed October 28, 1901. Serial No. 80,230. (No model.)

*To all whom it may concern:*

Be it known that I, ALFRED SCHWARTZ, a subject of the German Emperor, and a resident of Munich, Germany, have invented certain new and useful Improvements in Clutches for Induction-Motors, of which the following is a specification, the present application being a division of my prior application, Serial No. 51,734, filed March 18, 1901.

My present invention relates to an automatic clutch or coupling by the use of which (in connection with my method of starting induction-motors) the starting-current in motors for single-phased or multiphased currents may be greatly reduced, so that larger types of motors may be constructed with short-circuit armatures than has been heretofore possible with respect to the high-starting current. Moreover, the invention enables special devices for displacing the phases in the auxiliary phase employed in asynchronic single-phased motors to be omitted. In many cases the auxiliary phase may be dispensed with.

The principle involved by the invention is as follows: The shaft of the armature is extended on either side and journaled so that the armature may be easily shifted in axial directions. When the armature having, for instance, a short-circuit winding is located in its static field and when the latter is inserted into the circuit, the armature will be pushed axially out from the field, and in this position, in which it is partially out of the field, it will be started without charge after a slight rotation is imparted to it either by hand or otherwise, said armature making its normal number of revolutions after a short time. When the same rotates at its normal speed, just at the moment of synchronism it is again pulled into the field and then coupled by means of a clutch, also operated at this moment by the axial movement of the shaft. By reason of said clutch the motor—for instance, a single-phased motor—will be coupled to its charge only after the synchronism is reached. Experiments have proved that the starting of the motor under charge in this manner is effected in a few seconds.

The invention will now be clearly described with reference to the accompanying drawings.

Figure 1 is a longitudinal section of the clutch with the pulley R, the clutch-disk S, and the disengaging device T. Fig. 2 is a rear elevation of the clutch-disk S, and Fig. 3 is a front elevation of the disengaging device T. Fig. 4 shows the clutch in combination with a motor, and Fig. 5 shows a modified form of clutch.

By reason of the lateral shifting imparted to the armature of an induction-motor at the moment it reaches the normal speed the centrifugal clutch (shown in Fig. 1) will be engaged, whereby the motor is charged just at the moment it is most capable to carry the same away. In order to secure the engagement and disengagement of the clutch just at the moment the motor runs at its full speed, I provide on the laterally-movable driving part of the clutch a special disconnecting device whereby an untimely action of the swinging mass will be avoided.

Loosely mounted on the journal Z is a belt-pulley R, said journal being movable to the left in the bearing L by reason of the journal being connected to the armature-shaft W. The overlapping edge N prevents the pulley from being moved to the right. The inner cylindrical wall C of the extended part of the pulley receives the engaging jaws B, guided in the perforated projections s of the disk S and moved radially toward the shaft by the action of springs g. Each of the jaws carries on one side a small roller X, which is located under the curved rim or retainer T when the motor does not run at the required speed. The disk S is keyed on the shaft W, while the retainer or rim T is adapted to slide longitudinally on the latter. The relative rotation between the disk S and the retainer or rim T is avoided by means of four bolts D, screwed in the part T and extending through holes O in the disk S. The free ends of said bolts are also provided with small rollers Y. Arranged between T and the collar a', keyed on the shaft, is a coil-spring F', reinforcing the tendency of the armature to move out from the field when the latter is inserted into the circuit.

So long as the speed of the motor is under the normal full speed the clutch-disk will be disengaged from the belt-pulley R by reason of the position of the armature. Furthermore, the jaws B cannot be influenced by the centrifugal force, as the spring F' holds the curved rim T over the rollers X; but when the full speed is obtained and when the armature pulls the shaft toward the left the jaws B will partially enter the hollow cylinder C. At the same time the retainer or rim T is moved in the same direction by the spring F', said disk being pushed back at the moment the small roller Y engages the wall K of the pulley, whereby the disk S enters alone the cylinder C, as the rollers X are now disengaged from the retainer or rim T. Thus the jaws B are influenced by the centrifugal force, whereby a sudden coupling with radial pressure is produced.

When the motor is cut out, the armature will be moved to the right out of the field and the centrifugal force of the jaws will be quickly decreased, so that the springs may move the same toward the shaft and that the rollers X may again be brought under the retainer T.

Fig. 5 of the accompanying drawings shows that the improved clutch may also be applied to a belt-pulley R, provided with projections U, whereby the clutch acts as an ordinary clutch instead of a friction-clutch.

Having fully described my invention, what I claim, and desire to secure by Letters Patent, is—

1. In a clutch for induction-motors, the combination with a journal, of a belt-pulley mounted on the journal and provided with an extended cylindrical wall, an interior wall or partition in said pulley, a disk mounted to slide on the journal, radially-movable clutch-jaws carried by said disk, rollers carried by and extending outwardly from said jaws, means adapted to engage said rollers for holding said jaws in the retracted position, and means for engagement with the interior wall of the pulley to release the retaining means whereby said jaws engage the extended cylindrical wall of the pulley, substantially as described.

2. In a device of the character described, the combination with the journal, of a belt-pulley mounted thereon and provided with an interior wall or partition, a disk mounted for longitudinal movement on said journal, radially-movable jaws carried by said disk, rollers carried by said jaws, a spring-pressed retainer mounted on said journal for engagement with the rollers to normally hold said jaws in the retracted position and means for engagement with the interior wall or partition of the pulley to disengage the retainer from the pulleys, as and for the purpose specified.

In testimony whereof I have hereunto set my hand in presence of two witnesses.

ALFRED SCHWARTZ.

Witnesses:
R. W. HIEBL,
ELLUND NILSON.